(12) United States Patent
Okuno et al.

(10) Patent No.: US 11,995,816 B2
(45) Date of Patent: May 28, 2024

(54) IMAGE ANALYSIS APPARATUS, METHOD, AND PROGRAM

(71) Applicant: SHOWA DENKO K.K., Tokyo (JP)

(72) Inventors: Yoshishige Okuno, Tokyo (JP); Eriko Takeda, Tokyo (JP); Junichi Shibuya, Tokyo (JP); Yuki Nakao, Tokyo (JP); Kenji Ogawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 375 days.

(21) Appl. No.: 17/595,608

(22) PCT Filed: Apr. 24, 2020

(86) PCT No.: PCT/JP2020/017799
§ 371 (c)(1),
(2) Date: Nov. 19, 2021

(87) PCT Pub. No.: WO2020/241142
PCT Pub. Date: Dec. 3, 2020

(65) Prior Publication Data
US 2022/0327675 A1 Oct. 13, 2022

(30) Foreign Application Priority Data
May 27, 2019 (JP) .................... 2019-098384

(51) Int. Cl.
*G06T 7/00* (2017.01)
*G01N 15/14* (2006.01)
(Continued)

(52) U.S. Cl.
CPC ......... *G06T 7/001* (2013.01); *G01N 15/1434* (2013.01); *G06T 7/60* (2013.01);
(Continued)

(58) Field of Classification Search
CPC . G06T 7/001; G06T 7/60; G06T 2207/10056; G06T 2207/20084;
(Continued)

(56) References Cited

U.S. PATENT DOCUMENTS

| | | | |
|---|---|---|---|
| 2018/0260610 A1* | 9/2018 | Jadhav | ................. G06T 7/0004 |
| 2019/0096056 A1* | 3/2019 | Giering | ............... G06V 10/764 |
| 2021/0090290 A1* | 3/2021 | Lee | ..................... G06V 20/698 |

FOREIGN PATENT DOCUMENTS

| | | |
|---|---|---|
| JP | S60-052741 | 3/1985 |
| JP | H07-035696 | 2/1995 |

(Continued)

OTHER PUBLICATIONS

International Search Report dated Aug. 4, 2020 with respect to PCT/JP2020/017799.

*Primary Examiner* — Sean M Conner
*Assistant Examiner* — Stefano Anthony Dardano
(74) *Attorney, Agent, or Firm* — IPUSA, PLLC

(57) ABSTRACT

To improve a determination accuracy when determining each particle contained in an image of an object. An image analysis apparatus according to an embodiment of the present invention includes: a shape determination unit configured to determine a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained; a pseudo image generation unit configured to generate a pseudo image; and a similarity determination unit configured to determine whether the provisional NG image and the pseudo image are similar.

6 Claims, 11 Drawing Sheets

(51) Int. Cl.
*G01N 15/1434* (2024.01)
*G06T 7/60* (2017.01)
*G06V 10/74* (2022.01)
*G06V 10/75* (2022.01)

(52) U.S. Cl.
CPC .......... *G06V 10/752* (2022.01); *G06V 10/761* (2022.01); *G01N 2015/1497* (2013.01); *G06T 2207/10056* (2013.01); *G06T 2207/20084* (2013.01); *G06T 2207/30136* (2013.01)

(58) Field of Classification Search
CPC . G06T 2207/30136; G06T 2207/10024; G06T 2207/20081; G06T 7/0006; G01N 15/1434; G01N 2015/1497; G01N 15/0227; G01N 2015/0096; G01N 2015/0294; G01N 2015/1488; G01N 15/1475; G01N 15/1429; G01N 15/1463; G06V 10/752; G06V 10/761; G06V 20/695; G06V 20/698
See application file for complete search history.

(56) References Cited

FOREIGN PATENT DOCUMENTS

| | | | |
|---|---|---|---|
| JP | 2010-117175 | | 5/2010 |
| JP | 2018-116391 | | 7/2018 |
| JP | 2018116391 A | * | 7/2018 |
| WO | 2017/051327 | | 3/2017 |

* cited by examiner

IMAGE ANALYSIS APPARATUS, METHOD, AND PROGRAM

TECHNICAL FIELD

The present application is based on and claims priority to Japanese Patent Application No. 2019-098384, filed May 27, 2019. The contents of which are incorporated herein by reference in their entirety.

The present invention relates to an image analysis apparatus, a method, and a program.

BACKGROUND ART

Conventionally, in quality inspection of abrasive powder such as aluminum oxide powder and metal powder, an image of particles of aluminum oxide and the like obtained by an optical microscope and the like is analyzed, and it is determined whether or not the particles satisfy a predetermined standard. Specifically, an image of each particle is extracted from the image of the particles of aluminum oxide and the like, and it is determined whether or not a shape of each particle satisfies the predetermined standard.

CITATION LIST

Patent Literature

[PTL 1]
Japanese Laid-Open Patent Publication No. 2018-116391

SUMMARY OF INVENTION

Technical Problem

However, even when the particles actually satisfy the predetermined standard, if the particles overlap or aggregate in the image, these particles could be determined as not satisfying the predetermined standard, because it becomes difficult to distinguish the boundary between the particles.

Therefore, an object of the present invention is to improve the determination accuracy when determining each particle contained in the image of the object.

Solution to Problem

The present invention has the following configurations.
[1] An image analysis apparatus including:
a shape determination unit configured to determine a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;
a pseudo image generation unit configured to generate a pseudo image by superimposing a plurality of particle images including the OK particle image; and
a similarity determination unit configured to determine whether the provisional NG image and the pseudo image are similar, wherein in a case where the provisional NG image and the pseudo image are determined to be similar, the provisional NG particle is determined to include an OK particle.
[2] The image analysis apparatus according to [1], wherein the pseudo image is a particle image of a group of particles that is generated by superimposing a plurality of particle images at least including the OK particle image.
[3] An image analysis apparatus including:
a shape determination unit configured to determine a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;
a pseudo image generation unit configured to generate a pseudo image using a generative model; and
a similarity determination unit configured to determine whether the provisional NG image and the pseudo image are similar, wherein in a case where the provisional NG image and the pseudo image are determined to be similar, the provisional NG particle is determined to include an OK particle.
[4] The image analysis apparatus according to [3], wherein particle images used to generate the pseudo image at least include the OK particle image.
[5] The image analysis apparatus according to [3], wherein the generative model is Generative Adversarial Networks (GAN).
[6] The image analysis apparatus according to [5], wherein as the pseudo image, a pseudo image (fake) is generated using a plurality of particle images including the OK particle image as input data, and the provisional NG particle image as real data.
[7] The image analysis apparatus according to [5] or [6], wherein the pseudo image is generated using the OK particle image as input data, and an unclear image as real data.
[8] The image analysis apparatus according to [3], wherein the generative model is a Variational AutoEncoder (VAE).
[9] The image analysis apparatus according to [8], wherein the pseudo image is generated using a plurality of particle images including the OK particle image as input data, and the provisional NG particle image as data that is similar to the input data.
[10] The image analysis apparatus according to [8], wherein the pseudo image is generated using the OK particle image as input data, and an unclear image as data that is similar to the input data.
[11] The image analysis apparatus according to any one of [1] to [10], wherein the similarity determination unit determines whether the provisional NG particle image and the pseudo image are similar, by determining whether a contour of the provisional NG particle and a contour of the particle included in the pseudo image are similar.
[12] The image analysis apparatus according to any one of [1] to [11], wherein the similarity determination unit determines whether the provisional NG particle image and the pseudo image are similar, by determining whether a density value of each pixel of the provisional NG particle image and a density value of each pixel of the pseudo image are similar.
[13] A method performed by a computer, the method including:
determining a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;

generating a pseudo image by superimposing a plurality of particle images including the OK particle image; and determining whether the provisional NG image and the pseudo image are similar, wherein in a case where the provisional NG image and the pseudo image are determined to be similar, the provisional NG particle is determined to include an OK particle.

[14] A program for causing a computer to function as:

a shape determination unit configured to determine a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;

a pseudo image generation unit configured to generate a pseudo image by superimposing a plurality of particle images including the OK particle image; and a similarity determination unit configured to determine whether the provisional NG image and the pseudo image are similar, wherein in a case where the provisional NG image and the pseudo image are determined to be similar, the provisional NG particle is determined to include an OK particle.

Advantageous Effects of Invention

According to the present invention, a determination accuracy when determining each particle contained in the image of the object is improved.

DESCRIPTION OF EMBODIMENTS

Figure 1:
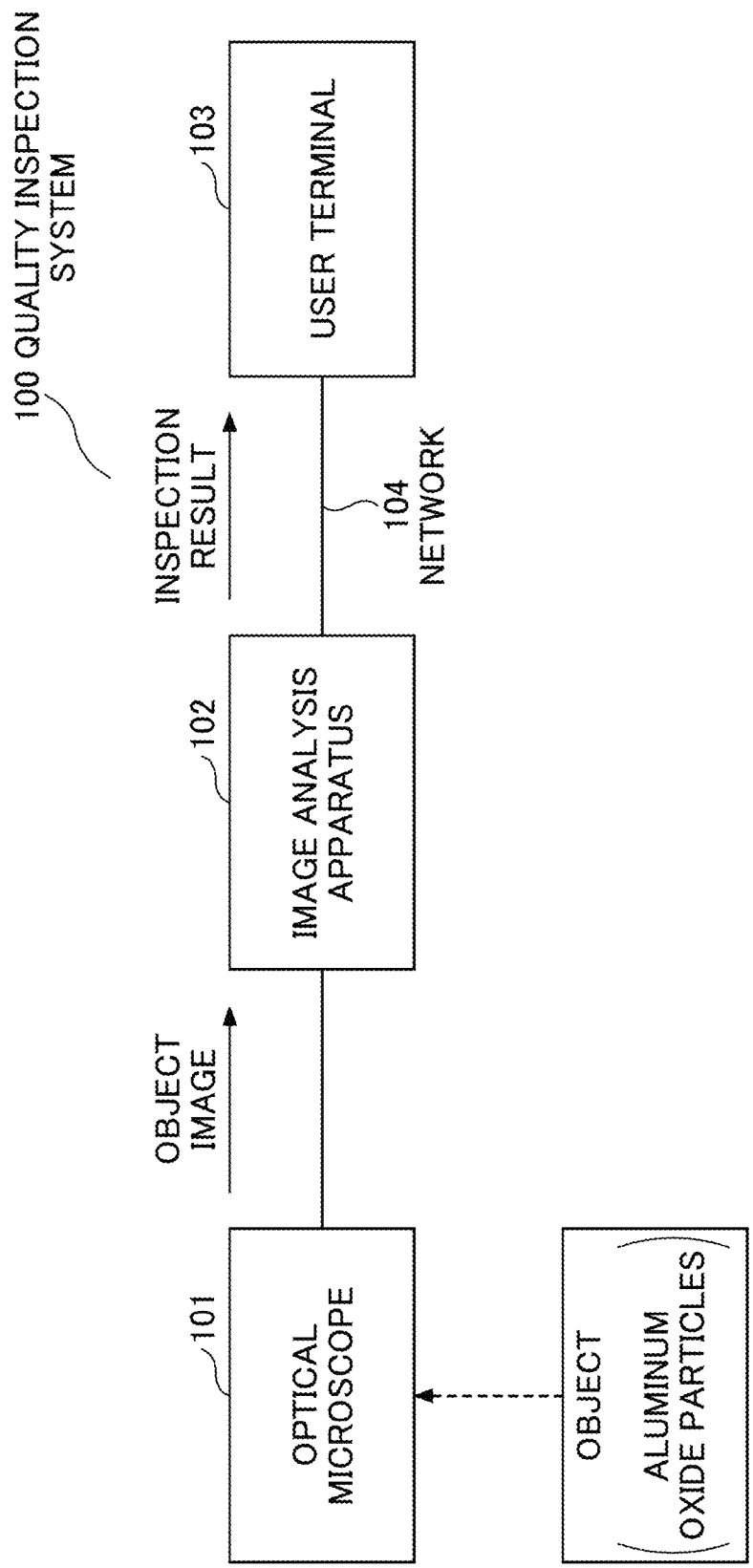
FIG. 1 is a diagram illustrating the overall configuration of a quality inspection system including an image analysis apparatus according to an embodiment of the present invention.

In the following, embodiments will be described with reference to the accompanying drawings. In the present specification and the drawings, components having substantially the same functional configuration are designated by the same reference numerals, so that duplicate description will be omitted.

In this specification, a case where it is determined whether or not aluminum oxide powder or the like satisfies a predetermined standard will be described. The present invention can be applied to a case in which it is determined whether a product, such as a powder containing particles of a substance, satisfies a predetermined standard. Also, in this specification, a case where an image is obtained by an optical microscope will be described. The present invention can be applied to a particle image obtained by any device including a scanning electron microscope (SEM).

Hereinafter, an embodiment (following Embodiment 1) in which a pseudo image (details will be described later) is generated based on a predetermined generation rule, and an embodiment (following Embodiment 2) in which a pseudo image is generated by machine learning will be explained separately.

Embodiment 1

<System Configuration>

FIG. 1 is a diagram illustrating the overall configuration of a system including an image analysis apparatus 102 according to an embodiment of the present invention. The image analysis apparatus 102 can be used in a system for performing quality inspection (a quality inspection system 100). The quality inspection system 100 may include an optical microscope 101, the image analysis apparatus 102, and a user terminal 103. The image analysis apparatus 102 acquires an image taken by the optical microscope 101 from the optical microscope 101 which is connected to the image analysis apparatus 102. The image analysis apparatus 102 transmits/receives data to/from the user terminal 103 via a network 104. Data transmission/reception may be performed via a storage medium such as a semiconductor memory described later. Each of these will be described below.

The optical microscope 101 takes an image of an object (for example, aluminum oxide particles contained in the aluminum oxide powder or the like). The optical microscope 101 may include a device for capturing an image such as a digital camera, and a storage device for storing the taken image of the object. Further, the optical microscope 101 sends the taken image of the object to the image analysis apparatus 102, which is connected to the optical microscope 101. The microscope included in the optical microscope 101 may be a reflection microscope or a transmission microscope. The optical microscope 101 may be provided with a light source such as an ultrahigh pressure mercury lamp, a xenon lamp, LEDs of various colors including three primary colors, an ultraviolet LED, and a laser. As a method for image observation, a bright field observation, a dark field observation, a phase difference observation, a differential interference observation, a polarization observation, and a fluorescence observation may be used.

The image analysis apparatus 102 is an apparatus for determining whether or not, for example, the aluminum oxide powder or the like satisfies a predetermined standard. The image analysis apparatus 102 includes, for example, one or more computers. Specifically, the image analysis apparatus 102 analyzes the image of the object (for example, a plurality of particles such as the aluminum oxide powder) sent from the optical microscope 101, and determines whether or not the aluminum oxide powder satisfies the predetermined standard. Further, the image analysis apparatus 102 transmits data of a result of a quality inspection to the user terminal 103. The image analysis apparatus 102 will be described in detail later with reference to FIGS. 2 and 3.

The user terminal 103 is a terminal used by a user who carries out a quality inspection. Specifically, the user terminal 103 transmits data of the predetermined standard to be satisfied by the aluminum oxide powder or the like, to the image analysis apparatus 102. Further, the user terminal 103 receives data of a result of the quality inspection from the image analysis apparatus 102 and displays the data on the user terminal 103 or on a display device (not shown) connected to the user terminal 103. The user terminal 103 is, for example, a computer such as a personal computer.

In this specification, the image analysis apparatus 102 and the user terminal 103 are described as separate computers, but the image analysis apparatus 102 and the user terminal 103 may be mounted on one computer. The image analysis apparatus 102 may have some functions of the user terminal 103.

<Hardware Configuration of Image Analysis Apparatus 102>

Figure 2:
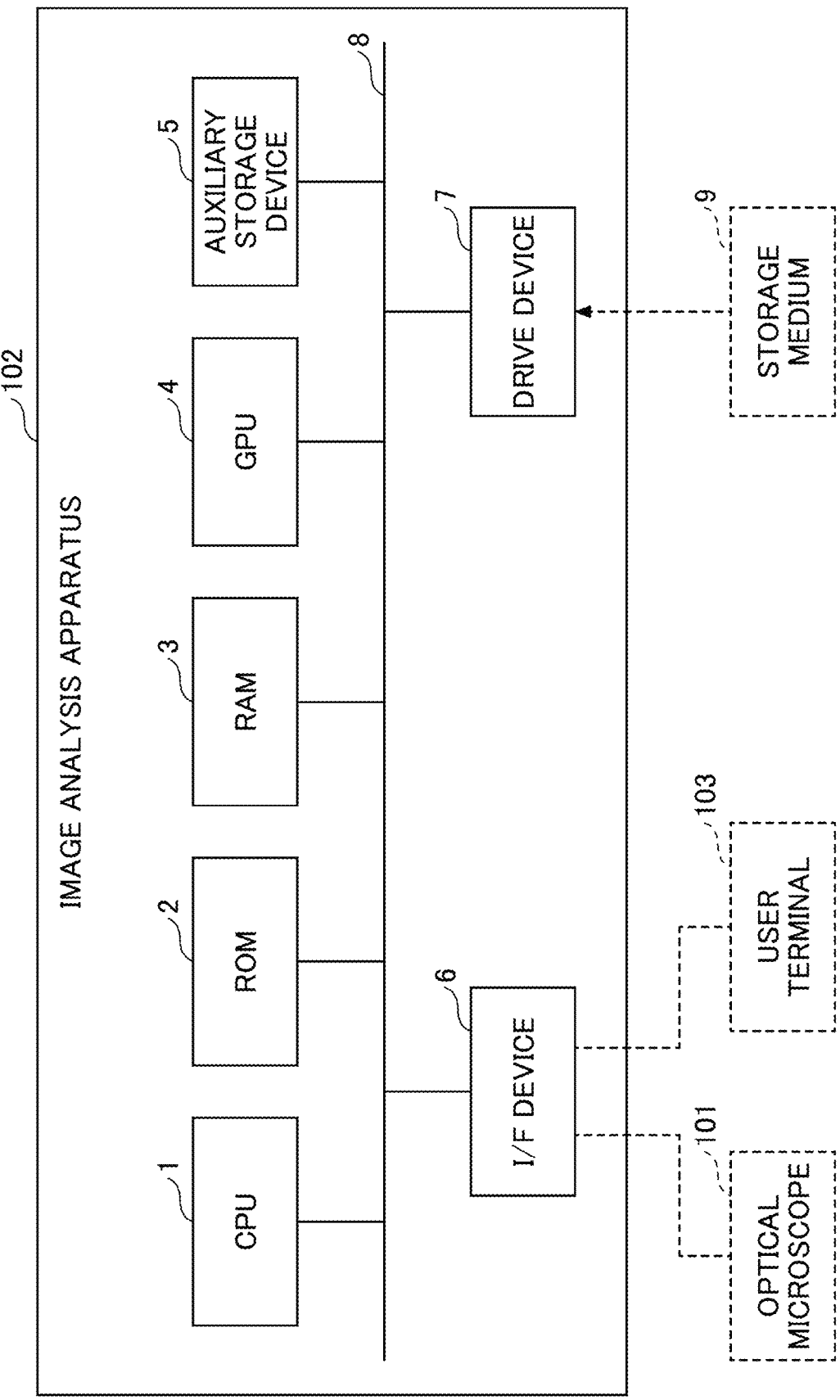
FIG. 2 is a diagram illustrating a hardware configuration of the image analysis apparatus according to the embodiment of the present invention.

FIG. 2 is a diagram illustrating an example of a hardware configuration of the image analysis apparatus 102 according to the embodiment of the present invention. The image analysis apparatus 102 includes a CPU (Central Processing Unit) 1, a ROM (Read Only Memory) 2, and a RAM (Random Access Memory) 3. The, CPU 1, the ROM 2, and the RAM 3 form a so-called computer.

The image analysis apparatus 102 may further include a GPU (Graphics Processing Unit) 4, an auxiliary storage device 5, an I/F (Interface) device 6, and a drive device 7. Each of the hardware devices of the image analysis apparatus 102 is connected to each other via a bus 8.

The CPU 1 is an arithmetic device that executes various programs installed in the auxiliary storage device 5.

The ROM 2 is a non-volatile memory. The ROM 2 functions as a main storage device for storing the various programs, data, and the like necessary for the CPU 1 to execute the various programs installed in the auxiliary storage device 5. Specifically, the ROM 2 functions as a main storage device for storing boot programs such as BIOS (Basic Input/Output System) and EFI (Extensible Firmware Interface).

The RAM 3 is a volatile memory such as a DRAM (Dynamic Random Access Memory) or a SRAM (Static Random Access Memory). The RAM 3 functions as a main storage device that provides a work area on which the various programs installed in the auxiliary storage device 5 are expanded when the programs are executed by the CPU 1.

The GPU 4 is an arithmetic device specialized in image processing.

The auxiliary storage device 5 is a device for auxiliary storage that stores the various programs and information used when the various programs are executed.

The I/F device 6 is a communication device for communicating with the optical microscope 101 and the user terminal 103.

The drive device 7 is a device for setting a storage medium 9. The storage medium 9 includes a medium that optically, electrically, or magnetically records information such as a CD-ROM, a flexible disk, a magneto-optical disk, or the like. The storage medium 9 may include a semiconductor memory or the like for electrically recording information, such as a ROM, and a flash memory.

The various programs installed in the auxiliary storage device 5 are installed as follows. For example, the storage medium 9 that is distributed is set in the drive device 7, then the various programs recorded in the storage medium 9 are read by the drive device 7. Alternatively, the various programs installed in the auxiliary storage device 5 may be installed by being downloaded from another network different from the network 104 via the I/F device 6.

<Functional Block of Image Analysis Apparatus 102>

Figure 3:
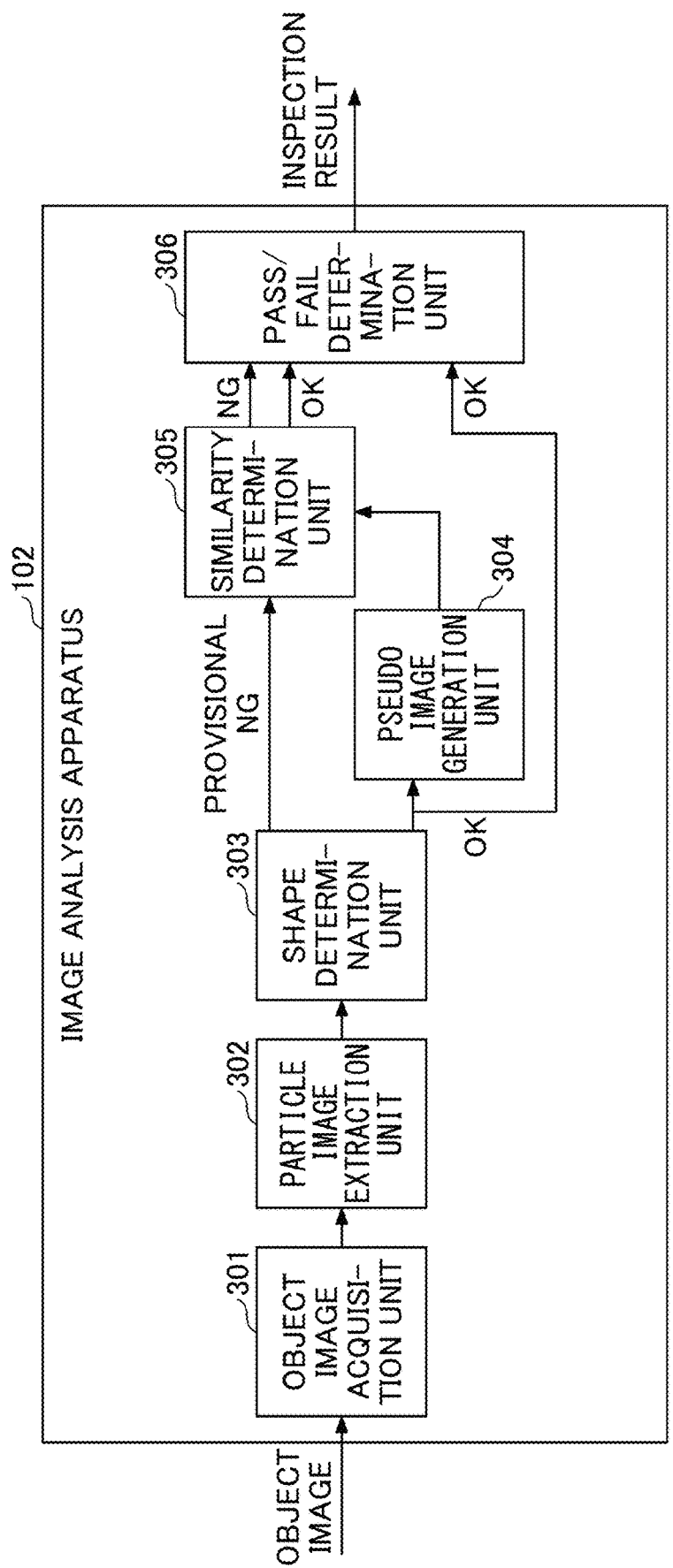
FIG. 3 is a diagram illustrating functional blocks of the image analysis apparatus according to the embodiment of the present invention.

FIG. 3 is a diagram illustrating functional blocks of the image analysis apparatus 102 according to the embodiment of the present invention. The image analysis apparatus 102 may include an object image acquisition unit 301, a particle image extraction unit 302, a shape determination unit 303, a pseudo image generation unit 304, a similarity determination unit 305, and a pass/fail determination unit 306. The image analysis apparatus 102 may function as the object image acquisition unit 301, the particle image extraction unit 302, the shape determination unit 303, the pseudo image generation unit 304, the similarity determination unit 305, and the pass/fail determination unit 306, by executing. programs. Each of these will be described below.

The object image acquisition unit 301 acquires the image of the object taken by the optical microscope 101 from the optical microscope 101. Further, the object image acquisition unit 301 stores the acquired image of the object in the storage device so that the particle image extraction unit 302 can refer to the image.

The particle image extraction unit 302, the shape determination unit 303, the pseudo image generation unit 304, and the similarity determination unit 305 perform processing for determining whether or not, for example, the aluminum oxide powder or the like satisfies the predetermined standard. An outline of an image analysis processing according to the embodiment of the present invention will be described with reference to FIG. 4.

Figure 4:
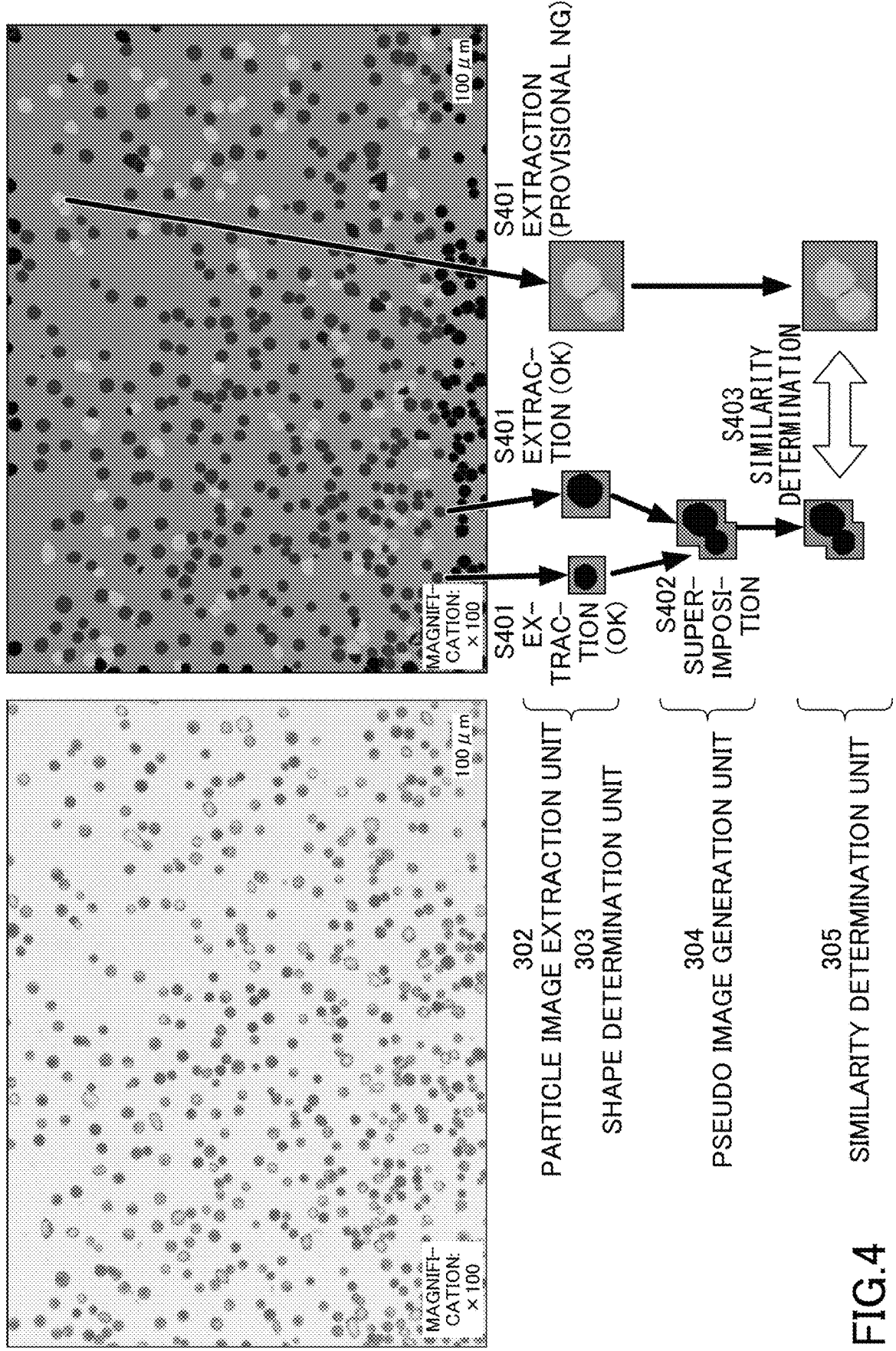
FIG. 4 is a diagram for explaining an outline of the image analysis processing according to the embodiment of the present invention.

FIG. 4 is a diagram for explaining the outline of the image analysis processing according to the embodiment of the present invention. The image illustrated in the upper part of FIG. 4 is the image of the object acquired by the object image acquisition unit 301 from the optical microscope 101. The image of the object includes an image of a plurality of particles.

In step 401 (S401), the particle image extraction unit 302 extracts an image of one particle or a plurality of superimposed particles from the image of the object. Then, the shape determination unit 303 determines whether or not the shape of a particle included in the extracted particle image satisfies the predetermined standard. Hereinafter, a particle image of a particle that satisfies the predetermined standard (hereinafter, also referred to as an OK particle) is referred to as an OK image (hereinafter, also referred to as an OK particle image). A particle image of a particle that does not satisfy the predetermined standard (hereinafter, also referred to as a provisional NG particle) is referred to as a provisional NG image (hereinafter, also referred to as a provisional NG particle image). That is, the shape of each particle of the particle image extracted from the image of the object is determined, and the OK image and the provisional NG image are obtained.

The image of the object may include an image having an unclear outline (also referred to as an edge-missing image) of the particle. This image having the unclear outline may be processed in the same manner as an image having a clear outline when the same image can be reproduced by, for example, removing a part of the outline of the image having the clear outline. That is, even if the image has the unclear outline of the particle, the image may be determined whether or not it satisfies the above-mentioned predetermined standard, and may be processed as the OK image or the provisional NG image, on the condition that the same image as the image can be reproduced from the image having the clear outline.

In step 402 (S402), the pseudo image generation unit 304 superimposes a plurality of particle images including the OK image obtained in S401 to generate a superimposed image (hereinafter, referred to as "pseudo image").

The pseudo image generation unit 304 may generate the pseudo image by superimposing a plurality of particle images including at least one OK image obtained in S401. The particle image used for generating the pseudo image may include a plurality of the OK images and may include the provisional NG image. As the provisional NG image used for generating the pseudo image, a provisional NG image extracted from the object image may be used. Also, a provisional NG image extracted from another object image for same powder (for example, an image of an aluminum oxide powder that is different from the aluminum oxide powder that has been inspected for quality, or another image of the aluminum oxide powder that has been inspected for quality) may be used. A provisional NG image that is formally determined to be an NG image as a result of performing similarity determination described later with respect to another object image of the same powder, may be used.

In step 403 (S403), the similarity determination unit 305 determines whether or not the provisional NG image extracted in S401 and the pseudo image generated in S402 are similar. When the provisional NG image and the pseudo image are similar, the similarity determination unit 305 regards the provisional NG particle as including an OK particle (that is, it is determined that the provisional NG particle is including a particle satisfying the predetermined standard in an overlapped or aggregated state). When the provisional NG image and the pseudo image are not similar, the provisional NG image is formally regarded as an NG image. That is, it is determined that a provisional NG particle of the provisional NG image determined to be similar to the pseudo image includes the same number of OK particles as the number of OK images used to generate the similar pseudo image.

Return to FIG. 3. As described above, the particle image extraction unit 302 extracts a particle image from the image of the object acquired by the object image acquisition unit 301. The particle image extraction unit 302 stores the extracted particle image in the storage device so that the shape determination unit 303 can refer to the extracted particle image.

The shape determination unit 303 determines whether or not the. shape of a particle included in the particle image extracted by the particle image extraction unit 302 satisfies the predetermined standard. For example, when roundness of the particle is equal to or larger than a threshold value, the shape determination unit 303 determines the image containing the particle as an OK image. The term roundness is defined as "the magnitude of the deviation of a circular shape from the geometrically perfect circle" in JIS B0621-1984 "Definitions and Designations of Geometrical Deviations". For example, when the roundness of the particle is less than the threshold value, the shape determination unit 303 determines the image containing the particle as a provisional NG image. The standard to be satisfied by the shape of the particle is not limited to the roundness. The case where the shape of the particle is an ellipse or the like may be included. The standard consisting of a feature such as an area of a particle, a major diameter, a minor diameter, a circle equivalent diameter, a Feret diameter or the like, and a perimeter of a particle, may be used.

Figure 5:
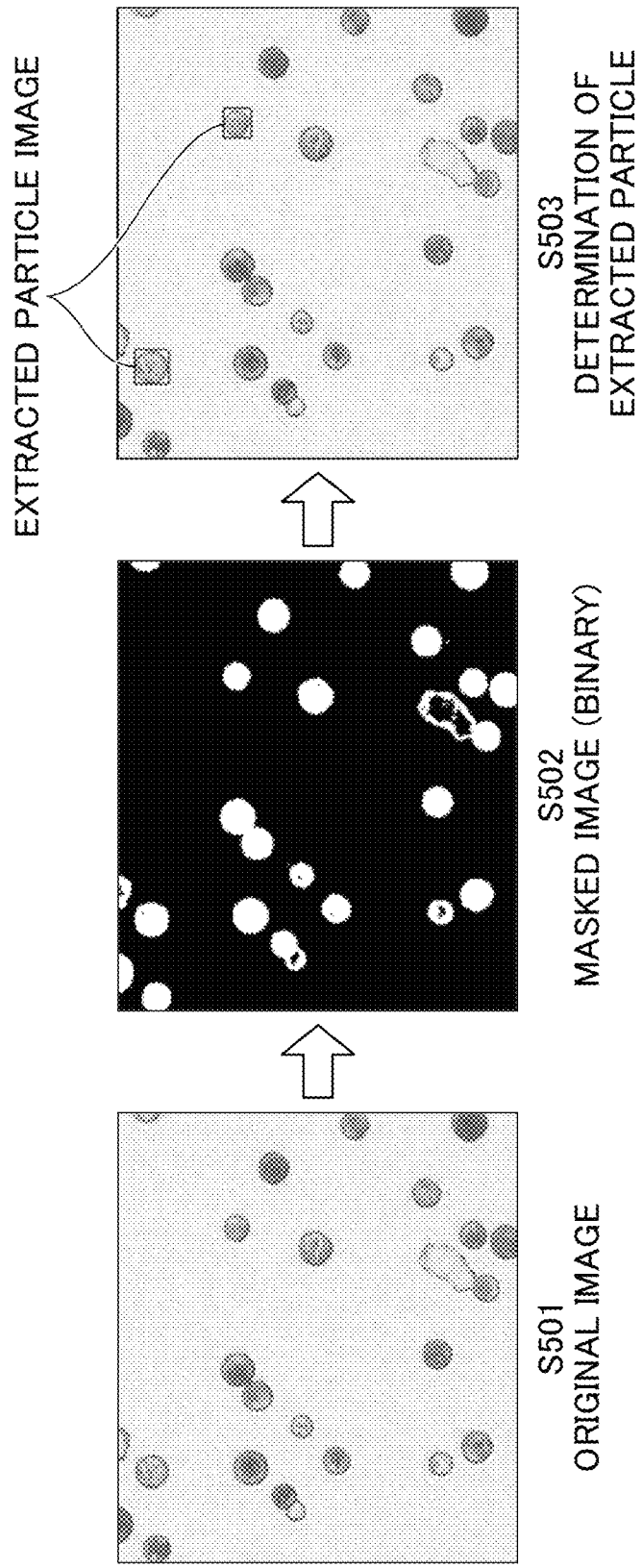
FIG. 5 is a diagram for explaining particle image extraction and shape determination according to the embodiment of the present invention.

FIG. 5 is a diagram for explaining particle image extraction and shape determination according to the embodiment of the present invention.

In step 501 (S501), the object image acquisition unit 301 acquires the image (the original image for the image analysis) of the object as illustrated in FIG. 5 from the optical microscope 101.

In step 502 (S502), the particle image extraction unit 302 extracts a particle image. For example, the particle image extraction unit 302 binarizes the original image acquired in S501 to generate a masked image (in FIG. 5, regions of particles are illustrated in white, and a region other than the particles is illustrated in black) as illustrated in FIG. 5. Then, based on the masked image, the particle image extraction unit 302 extracts (also called "crop", or "cut out") an image of a particle having no other particles around the particle, from the original image acquired in S501.

In step 503 (S503), the shape determination unit 303 determines whether or not the particle included in the particle image extracted in S502 satisfies the predetermined standard.

Return to FIG. 3. The pseudo image generation unit 304 generates the superimposed image (that is, the pseudo image) by superimposing a plurality of particle images.

The pseudo image will be described. The pseudo image is generated by superimposing two or more images of the particle. That is, the pseudo image may be generated using two images of the particle, or using three or more images of the particle. The pseudo image may also be generated using at least one OK image. That is, the pseudo image may be generated using an OK image only, or using an OK image and an image other than an OK image (for example, a provisional NG image).

The provisional NG image used to generate the pseudo image may include a provisional NG image extracted from the object image, or a provisional NG image extracted from another object image for same powder. A provisional NG image that is formally determined to be an NG image as a result of performing similarity determination described later with respect to another object image of same powder, may be used.

Hereinafter, pseudo image generation according to the embodiment of the present invention will be described with reference to FIG. 6.

Figure 6:
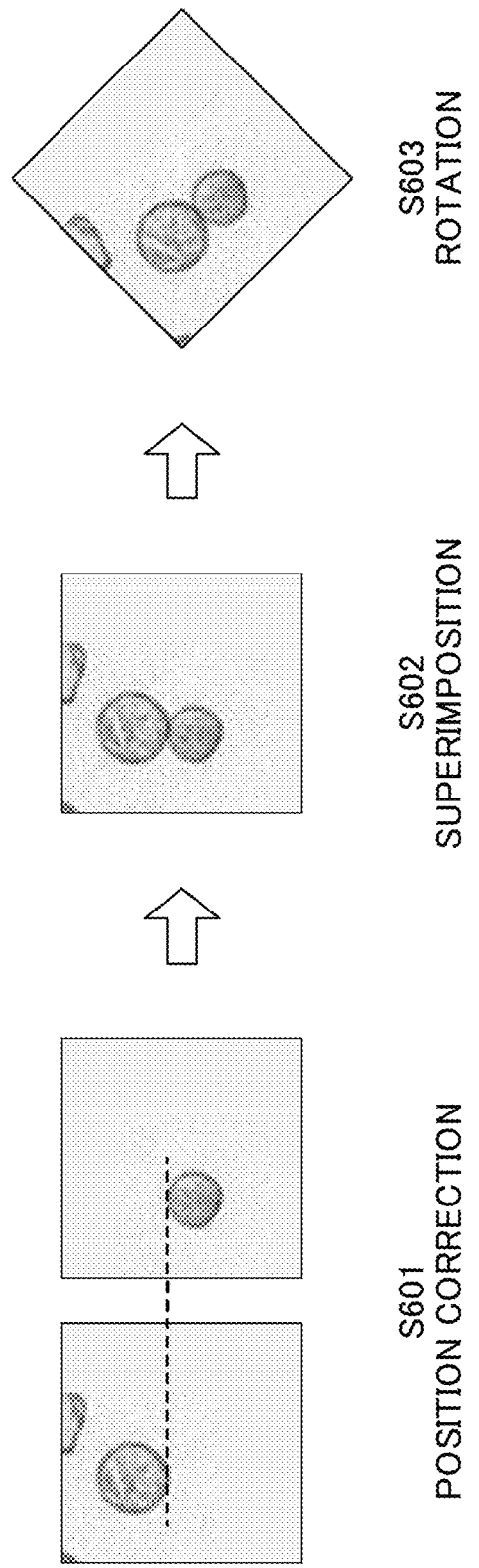
FIG. 6 is a diagram for explaining pseudo image generation according to the embodiment of the present invention.

FIG. 6 is a diagram for explaining the pseudo image generation according to the embodiment of the present invention.

The pseudo image generation unit 304 randomly selects a particle image used to generate a pseudo image. Specifically, the pseudo image generation unit 304 may select two or more particle images including at least one OK image, from an OK image and an image other than an OK image (for example, a provisional NG image).

In Step 601 (S601), the pseudo image generation unit 304 performs position correction of the selected two or more particle images. Specifically, the pseudo image generation unit 304 determines positional relationship of the particle images such that the particles in the images come into contact with each other. The pseudo image generation unit 304 may generate various pseudo images by adjusting locations where the particles in the particle images come into contact with each other.

In Step 602 (S602), the pseudo image generation unit 304 superimposes the particle images for which the position correction is performed in S601. The pseudo image generation unit 304 may generate various pseudo images by adjusting the degree of superimposition.

In Step 603 (S603), the pseudo image generation unit 304 rotates a group of the particle images superimposed in S602. The pseudo image generation unit 304 may generate various pseudo images by adjusting degree of rotation of the superimposed group of the particle images.

In addition to the above-described adjustment of the parameters, the pseudo image generation unit 304 may generate various pseudo images by adjusting various parameters. The parameters, for example, may be any combination of the number of particles, a location of contact between particles in particle images, degree of overlap, degree of rotation of a superimposed group of particle images, and circularity, color, transparency, blurring, or the like, of a particle in an image. The pseudo image generation unit 304 may generate a pseudo image by using a method in which particles are dropped from one direction into a frame (also called a Tetris (registered trademark) method).

Returning to FIG. 3, the similarity determination unit 305 determines whether or not the provisional NG image determined by the shape determination unit 303 is similar to a pseudo image generated by the pseudo image generation unit 304. When the provisional NG image and the pseudo image are similar, the similarity determination unit 305 determines that a provisional NG particle of the provisional NG image includes an OK particle (that is, it is determined that a plurality of particles including an OK particle are overlapped or aggregated) and when the provisional NG image and the pseudo image are not similar, the provisional NG image is formally determined to be an image of an NG particle. Hereinafter, two examples of the similarity determination will be explained.

<Similarity Determination Based on Contour>

The similarity determination unit 305 compares a contour (outline) of a particle of the superimposed particle image included in the pseudo image with the contour (outline) of a particle included in the provisional NG image. For example, when a difference between the contour of the particle of the superimposed particle image included in the pseudo image and the contour of the particle of the provisional NG image is less than or equal to a threshold value, the similarity determination unit 305 determines that both images are similar. For example, when a difference between the contour of the particle of the superimposed particle image included in the pseudo image and the contour of the particle of the provisional NG image is greater than the threshold value, the similarity determination unit 305 determines that both images are not similar.

<Similarity Determination Based on Color Density>

In addition to or in place of the above-described "Similarity determination based on contour", the similarity determination unit 305 can perform similarity determination based on color density of each pixel in the image. Specifically, the similarity determination unit 305 compares a density value of each pixel of the pseudo image and a density value of the provisional NG image. For example, when a difference between the density value of each pixel of the pseudo image and the density value of each pixel of the provisional NG image is less than or equal to a threshold value, the similarity determination unit 305 determines that both the images are similar. In contrast, for example, when a difference between the density value of each pixel of the pseudo image and the density value of each pixel of the provisional NG image is larger than the threshold value, the similarity determination unit 305 determines that both images are not similar. When similarity determination based on a pixel is performed, the particle image of the pseudo image and the provisional NG image to be compared both preferably have 32×32 or more pixels, and preferably 64×64 or more pixels.

The pass/fail determination unit 306 determines whether or not the powder containing the particle which is the object is passing (that is, the pass/fail determination unit 306 determines a result of a quality inspection). Specifically, the pass/fail determination unit 306 counts the number of the OK particles that are determined to be OK images by the shape determination unit 303 and the number of the OK particles of the provisional NG images that are determined to be similar to pseudo images by the similarity determination unit 305. The pass/fail determination unit 306 performs determination by using the counted values.

The pass/fail determination may be performed after repeating a series of steps from taking the image of the object to the similarity determination described above and accumulating data so that the number of particle images extracted from the image of the object is preferably 100 or more, more preferably 500 or more, and more preferably 1,000 or more.

Two examples of notification are described below.

<Notification of Number Value>

The pass/fail determination unit 306 notifies the user terminal 103 of a percentage of the sum of the number value 1 and the number value 2 to the sum of the number value 1, the number value 2, and the number value 3, when a total number of OK particles, which are determined to be OK images by the shape determination unit 303, is set to be a number value 1, a total number of OK particles included in provisional NG images determined to be similar to pseudo images by the similarity determination unit 305 is set to be a number value 2, and a total number of NG particles, which are formally determined to be NG images by the similarity determination unit 305, is set to be a number value 3. When any value is set as a radius of a particle, which is one of the above-described examples of the predetermined standard for shape determination, a volume of the particle can be determined. A 50% cumulative volume particle size ($D_{50}$) may be notified as a cumulative distribution of a volume of OK particles which are determined to be OK images by the shape determination unit 303 and OK particles included in provisional NG images which are determined to be similar to pseudo images by the similarity determination unit 305.

<Notification of Passing>

The pass/fail determination unit 306 determines that the powder or the like which includes the object passes, when a percentage of the sum of the number value 1 and the number value 2 to the sum of the number value 1, the number value 2, and the number value 3 is equal to or more than a predetermined value, when a total number of OK particles which are determined to be OK images by the shape determination unit 303 is set to be a number value 1, a total number of OK particles included in provisional NG images which are determined to be similar to pseudo images by the similarity determination unit 305 is set to be a number value 2, and a total number of NG particles which are formally determined to be NG images by the similarity determination unit 305 is set to be a number value 3. At this time, the pass/fail determination unit 306 notifies the user terminal 103 that the powder or the like which includes the object is passing. The predetermined value for passing is preferably 95%, more preferably 97%, and preferably 99%.

Figure 7:
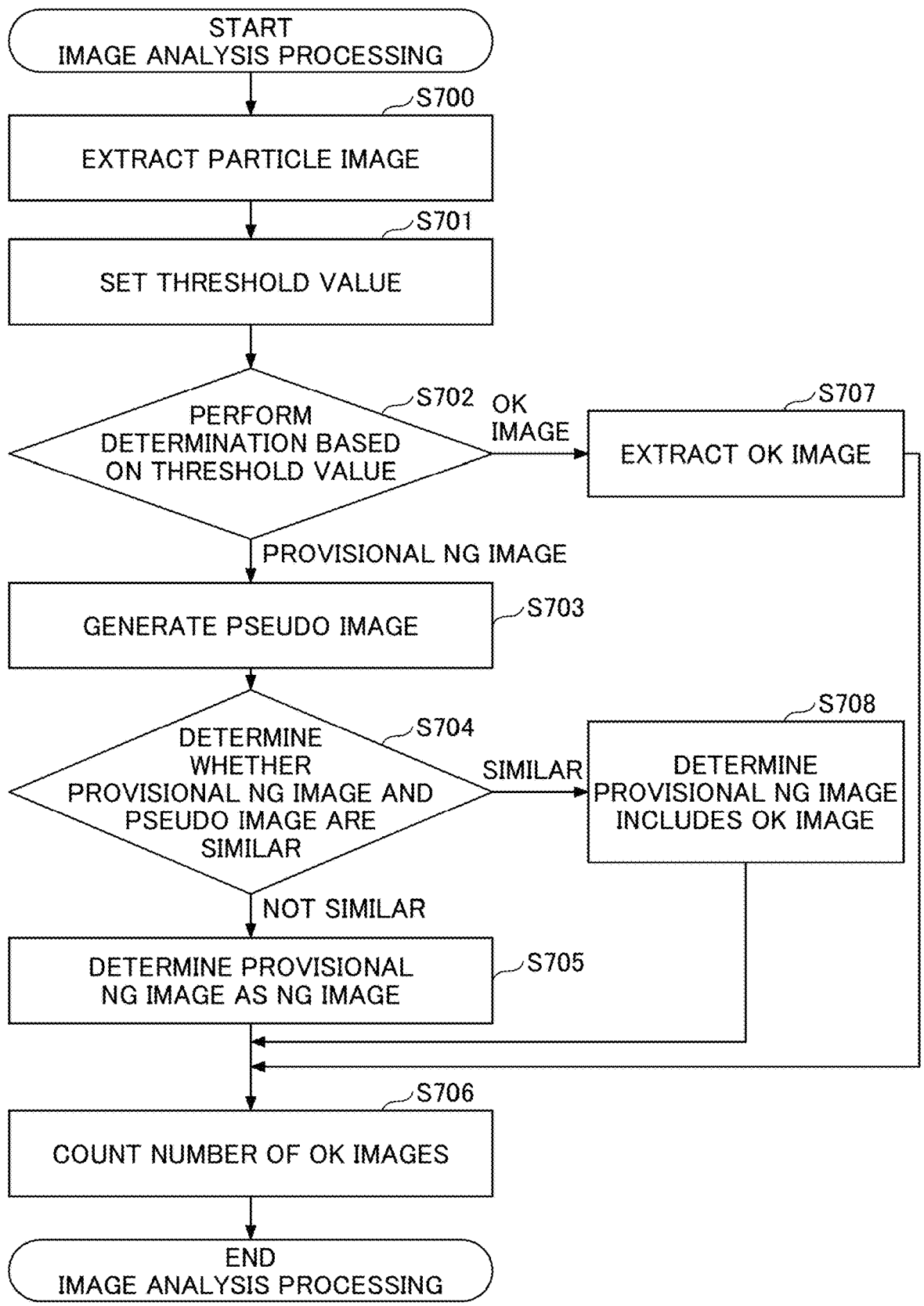
FIG. 7 is a flowchart for illustrating a flow of image analysis processing according to the embodiment of the present invention.

FIG. 7 is a flowchart for illustrating a flow of image analysis processing according to the embodiment of the present invention.

In step 700 (S700), the particle image extraction unit 302 extracts and prepares a particle image. When extracting the particle image, the above-described process of cropping or the like can be performed.

In step 701 (S701), the shape determination unit 303 sets a standard (e.g., a threshold value) to be satisfied by a particle included in the particle image. For example, the shape determination unit 303 may set a standard that is specified by the user terminal 103.

In step 702 (S702), the shape determination unit 303 determines whether or not the particle image extracted in S700 satisfies the standard set in S701. When it is determined that the predetermined standard is not satisfied (that is, the particle image is a provisional NG image), the process proceeds to step 703. When it is determined that the predetermined standard is satisfied (that is, the particle image is an OK image), the process proceeds to step 707. When an image having an unclear outline of a particle is included, the shape determination unit 303 may further perform the above-described determination on the image having the unclear outline.

In step 707 (S707), the shape determination unit 303 notifies the pass/fail determination unit 306 of the number of OK images.

In step 703 (S703), the pseudo image generation unit 304 generates a pseudo image.

The pseudo image generation unit 304 may generate the pseudo image each time a quality inspection is performed, or may use a pseudo image that is already generated (that is, a pseudo image that is generated using an OK image of the same material as the object for which the quality inspection is to be performed).

In step 704 (S704), the similarity determination unit 305 determines whether or not the provisional NG image that is determined in S702 is similar to the pseudo image of S703. When it is determined that the images are not similar, the process proceeds to step 705, and when it is determined that the images are similar, the process proceeds to step 708.

In step 708 (S708), the similarity determination unit 305 notifies the pass/fail determination unit 306 of the number of OK particles included in the provisional NG image that is determined to be similar to the pseudo image.

In step 705 (S705), the similarity determination unit 305 formally determines the provisional NG image to be an NG image. The number of NG particles which are formally determined to be NG images is notified to the pass/fail determination unit 306.

In step 706 (S706), the pass/fail determination unit 306 counts the number of the OK particles which are determined to be OK images in S702, the number of OK particles included in the provisional NG image which is determined to be similar to the pseudo image in S708 (that is, the number of OK particles included in the pseudo image which is determined to be similar in S704), and the number of NG particles which are formally determined to be NG images in S705.

According to the present invention, among provisional NG images which are provisionally determined as NG images, a provisional NG image that is determined to be similar to a pseudo image generated using an OK image is determined to include one or more OK particles. Therefore, a particle image in which particles that satisfy a predetermined standard are overlapped or aggregated can be processed as an OK particle image, whereas such an image is determined not to satisfy the predetermined standard in a conventional image analysis.

Embodiment 2

Hereinafter, an embodiment in which a pseudo image similar to an actual image is generated by machine learning will be described with reference to FIGS. 8 to 11. Different points from the embodiment 1 will be mainly described.

In Embodiment 2, a pseudo image is generated using a generative model. The generative model is a method in which training data are learned to generate new data that is similar to the training data. In the generative model, learning is performed so that the distribution of the training data used for learning and the distribution of the generated data are matched. Examples of the generative model include, for example, Generative Adversarial Networks (GAN), and a Variational AutoEncoder (VAE). By using the generative model, a pseudo image that is close to the actual image may be generated.

A case where the Generative Adversarial Networks (GAN) is used as the generative model will be described with reference to the drawings.

Figure 8:
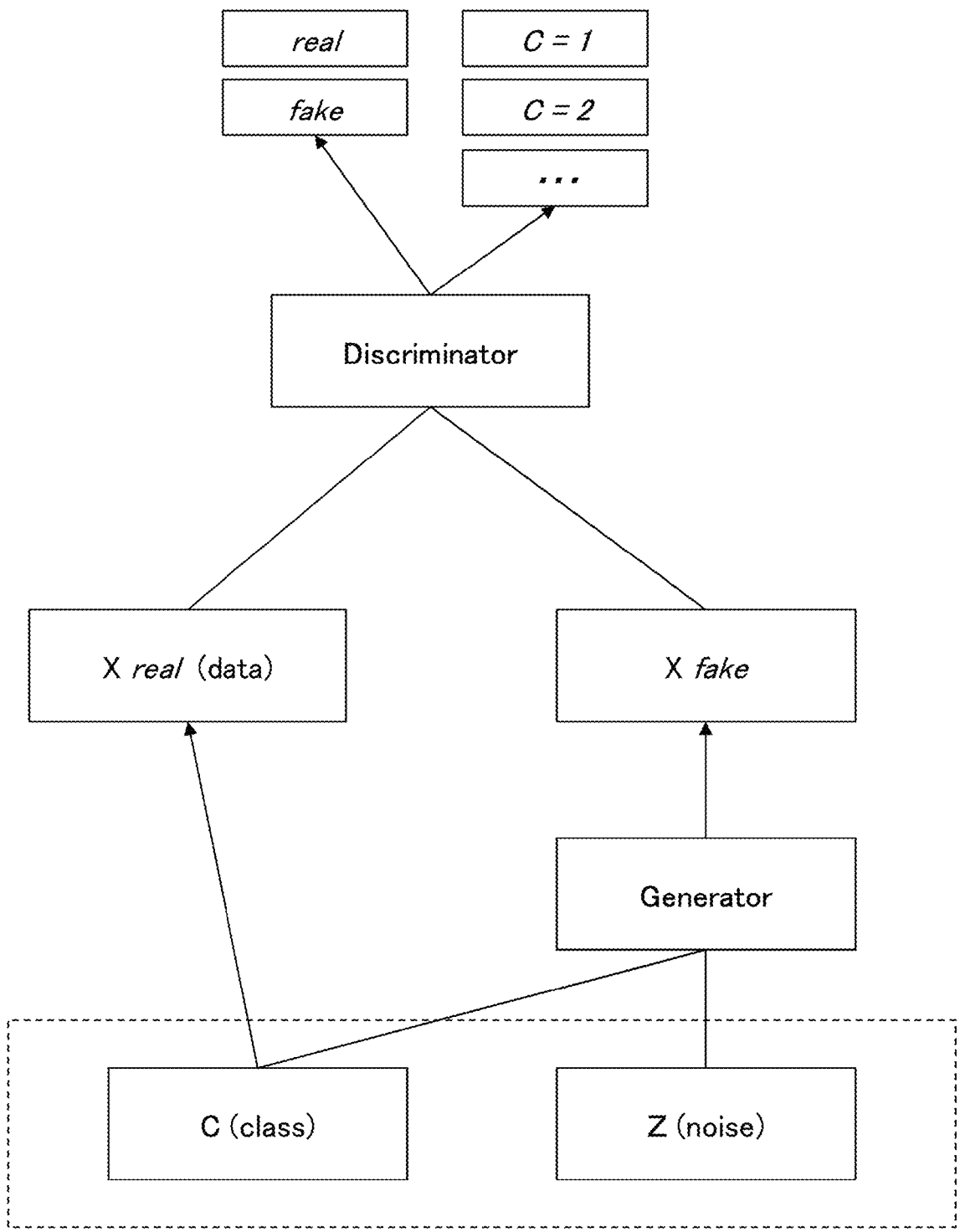
FIG. 8 is a diagram for explaining machine learning according to the embodiment of the present invention.
Figure 9:
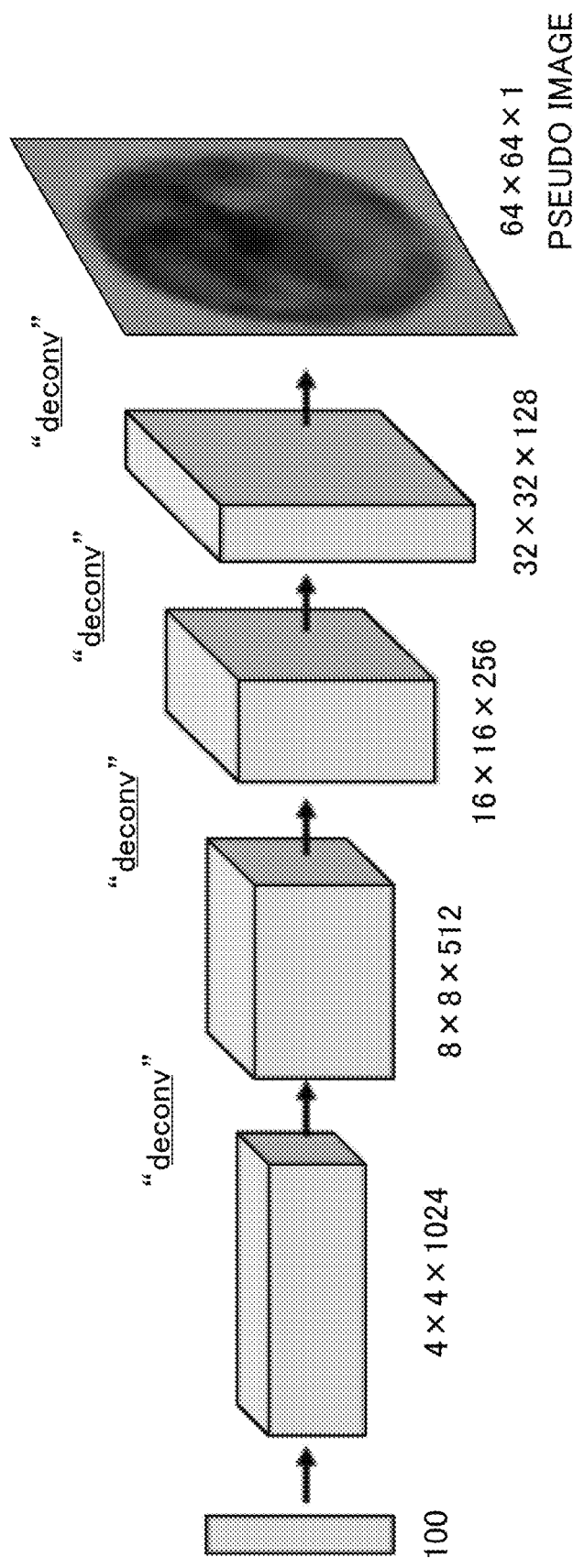
FIG. 9 is a diagram for explaining machine learning according to the embodiment of the present invention.

FIGS. 8 and 9 are diagrams for explaining the GAN according to the embodiment of the present invention.

In FIG. 8, input noise (Z (noise), for example, a random number) and class information (C (class)) of an input image are input into a generative network (Generator) so that a pseudo image (fake) (X fake) is generated. In a discriminative network (Discriminator), the pseudo image (fake) and real data (X real (data)) are compared, and a class together with an authenticity (real or fake) of the pseudo image (fake) is determined. FIG. 9 illustrates the process of deconvolution ("deconv") in which a pseudo image (fake) is generated by upsampling a feature in the generative network (Generator). In the figure, "100" is an example of the feature, and corresponds to the sum of C (class) and Z (noise) in the configuration of the GAN in FIG. 8.

Figure 10:
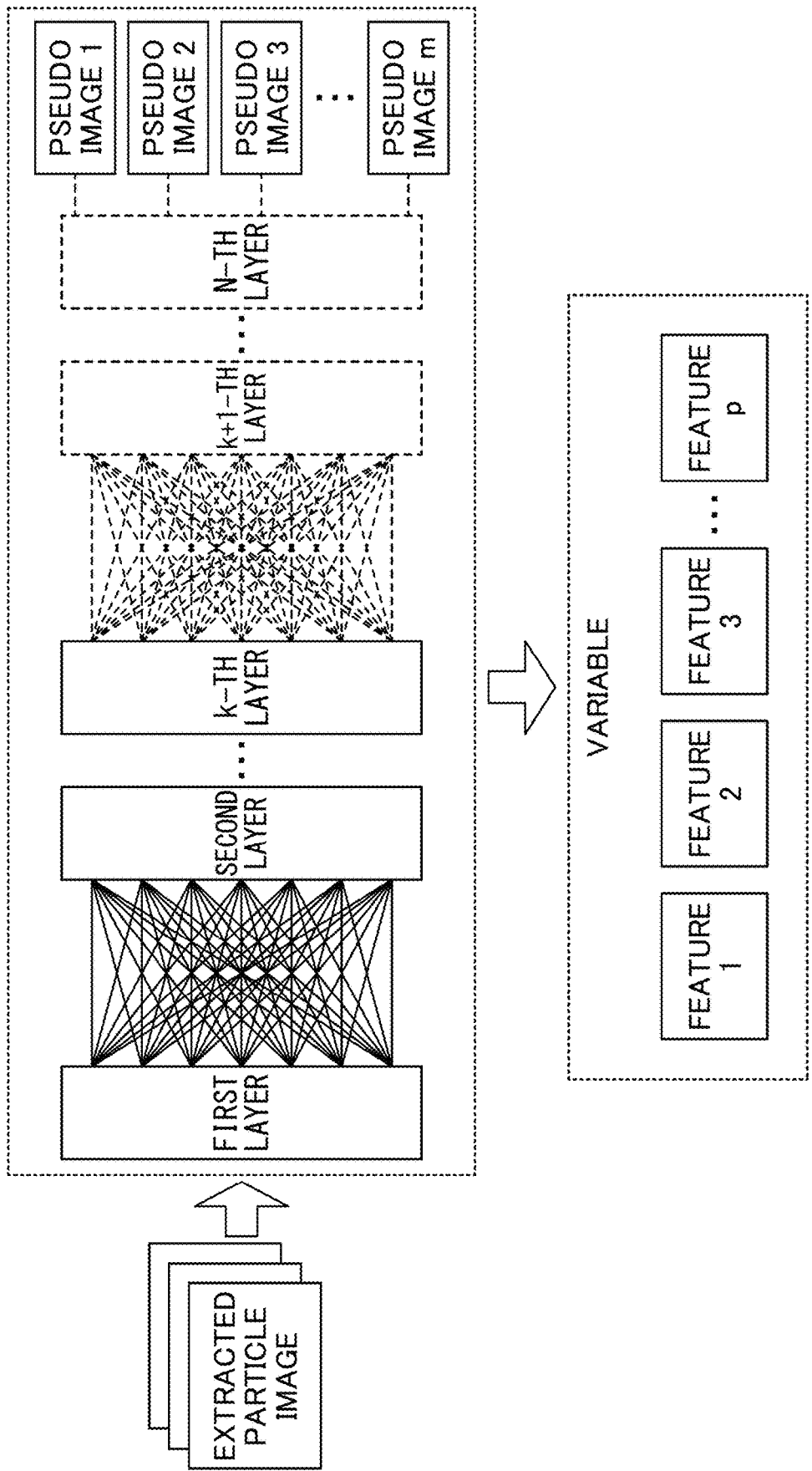
FIG. 10 is a diagram for explaining machine learning according to the embodiment of the present invention.
Figure 11:
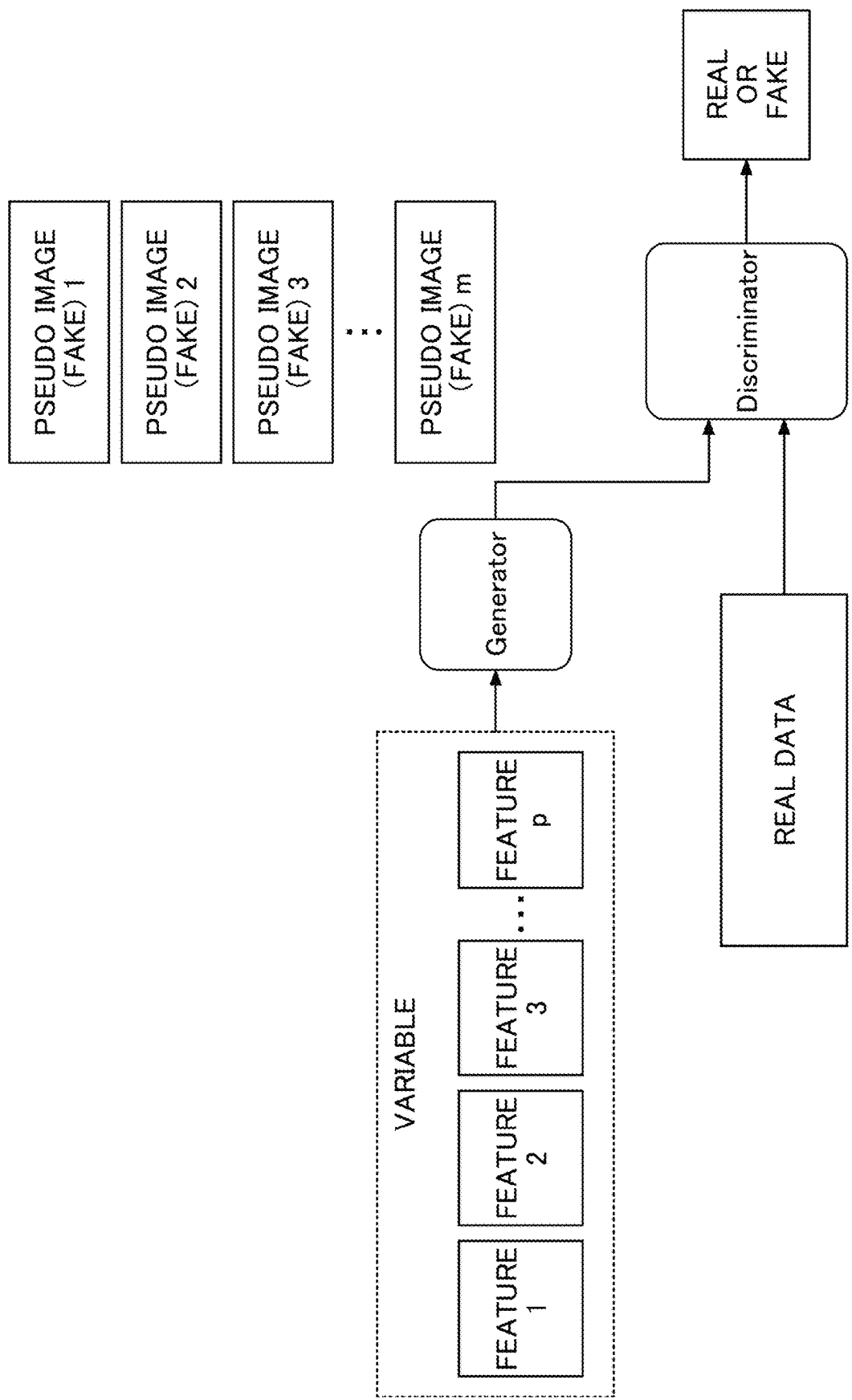
FIG. 11 is a diagram for explaining machine learning according to the embodiment of the present invention.

It is also possible to obtain a feature of the object image by machine learning and use the feature in combination with the GAN. As illustrated in FIG. 10, a feature is extracted by machine learning using a network having an early-stage network in which an image of an object (that is, input data including an OK image and a provisional NG image) is input in the input layer and a feature is output in the output layer, and a late-stage network in which the feature output from the early-stage network is input in the input layer and a pseudo image generated in the embodiment 1, is output in the output layer. Next, as illustrated in FIG. 11, using the GAN, a pseudo image (fake) is generated by using the provisional NG image to be determined as real data. Specifically, various pseudo images (fakes) are generated by adjusting the feature (the feature extracted in FIG. 10) of the generative network (Generator). The generative network (Generator) is the same as the above-described late-stage network in which the pseudo image is output by inputting the feature. The discriminative network (Discriminator) compares the generated pseudo image (fake) with the real data (that is, the provisional NG image used as the real data) to discriminate between real and fake. Because the generative network learns to deceive the discriminative network and the discriminative network learns to perform discrimination more accurately, as the learning progresses, the generative network generates a pseudo image (fake) that is closer to the real data.

When the GAN is used as the generative model, extraction of the above-described feature is performed using a plurality of extracted particle images including OK images as input data. More specifically, extraction of the above-described feature is performed using, as input data, a plurality of extracted particle images including OK images and not including a provisional NG image to be similarity-determined. In addition, the number of OK images used for generating a pseudo image (fake) is obtained as additional information. The generative network generates a pseudo image (fake) using a provisional NG image to be similarity-determined as real data. As a result of learning by the GAN, the pseudo image (fake) is generated that is determined to be similar to the provisional NG image. By referring to the additional information of the generated pseudo image (fake), the number of OK particles included in the provisional NG image to be similarity-determined is obtained.

The image of the object may include an image having an unclear outline (also referred to as an edge-missing image) of a particle, or an unclear image (also referred to as a noise-containing image) due to noise included in pixels. For these unclear images, when the GAN is used as the generative model, an OK image may be used as input data to extract a feature, and a pseudo image is generated using the unclear image of the object as real data. The obtained unclear pseudo image may be processed as an OK image.

A case where the Variational AutoEncoder (VAE) is used will be described. The VAE, similar to the GAN, learns features that represent data and generates output data similar to input data. In the VAE, an encoder on the input layer determines a mean vector and a variance vector. Based on these vectors, a latent variable is probabilistically extracted. A decoder on the output layer generates output data similar to the input data using the extracted latent variable by reproducing the original data. In the VAE, the latent variable is adjusted to retain as much of the feature of the input data as possible. As a result of such learning, a particle image is generated that resembles a provisional NG image to be similarity-determined.

When the VAE is used as the generative model, a pseudo image is generated as follows: a plurality of particle images including OK images are input and the images are superimposed to be input data on the input layer side, and a provisional NG image is used as data similar to the input data. More specifically, extracted particle images, including OK images and not including a provisional NG image to be similarity-determined, are input, and a mean vector and a variance vector are obtained using the image superimposed on the input layer as input data. Based on these vectors, the latent variable is probabilistically extracted, and using the extracted. latent variable, a plurality of pseudo images similar to the provisional NG image to be similarity-determined are generated, and the number of the OK images used to generate the pseudo image is obtained as the additional information. When the pseudo image is determined to be similar to the provisional NG image to be similarity-determined, the number of the OK particles included in the provisional NG image is obtained by referring to the additional information of the generated pseudo image.

When the VAE is used as the generative model, and when the unclear image described above is included, the pseudo image may be generated by using an OK image as input data and the unclear image as output data similar to the input data. When the pseudo image is determined to be similar to the unclear image, the pseudo image may be processed as an OK image.

In the Embodiment 2, regarding an image of a group of particles in a pseudo image, the manners in which particles overlap and agglomerate become closer to those of a real image, as described above. Unnaturalness peculiar to synthesis which may occur in above-described Embodiment 1 is eliminated. Therefore, it is possible to generate the pseudo image like an image of an actual existing particle group (that is, an actual particle group in which particles satisfying a predetermined standard overlap or agglomerate).

It should be noted that the present invention is not limited to the above-described configurations. The present invention includes such as a combination of other elements with the configurations described in the above embodiment. In these respects, it is possible to change the scope of the invention without departing from the spirit of the invention, and it can be appropriately determined in accordance with the application form.

100 quality inspection system
101 optical microscope
102 image analysis apparatus
103 user terminal
104 network
301 object image acquisition unit
302 particle image extraction unit
303 shape determination unit
304 pseudo image generation unit
305 similarity determination unit
306 pass/fail determination unit

The invention claimed is:

1. An image analysis apparatus comprising:
   a shape determination unit configured to determine a shape of a particle included in a particle image that is extracted from an image of an object, so that an OK particle image which is a particle image of an OK particle that satisfies a predetermined standard for shape, and a provisional NG particle image which is a particle image of a provisional NG particle that does not satisfy the predetermined standard, are obtained;
   a pseudo image generation unit configured to generate a pseudo image by superimposing a plurality of particle images including the OK particle image; and
   a similarity determination unit configured to determine whether the provisional NG image and the pseudo image are similar, wherein in a case where the provisional NG image and the pseudo image are determined to be similar, the provisional NG particle is determined to include an OK particle.

2. The image analysis apparatus according to claim 1, wherein the pseudo image is a particle image of a group of particles that is generated by superimposing a plurality of particle images at least including the OK particle image.

3. The image analysis apparatus according to claim 1, wherein the similarity determination unit determines whether the provisional NG particle image and the pseudo image are similar, by determining whether a contour of the provisional NG particle and a contour of the particle included in the pseudo image are similar.

4. The image analysis apparatus according to claim 1, wherein the similarity determination unit determines whether the provisional NG particle image and the pseudo image are similar, by determining whether a density value of each pixel of the provisional NG particle image and a density value of each pixel of the pseudo image are similar.

5. A method performed by a computer, the method comprising:
   determining a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;

generating a pseudo image by superimposing a plurality of particle images including the OK particle image; and determining whether the provisional NG image and the pseudo image are similar, wherein in a case where the provisional NG image and the pseudo image are determined to be similar, the provisional NG particle is determined to include an OK particle.

6. A non-transitory computer-readable recording medium storing a program for causing a computer to function as:

a shape determination unit configured to determine a shape of a particle included in a particle image that is extracted from an image of an object, so that an OK particle image which is a particle image of an OK particle that satisfies a predetermined standard for shape and a provisional NG particle image which is a particle image of a provisional NG particle that does not satisfy the predetermined standard, are obtained;

a pseudo image generation unit configured to generate a pseudo image by superimposing a plurality of particle images including the OK particle image; and a similarity determination unit configured to determine whether the provisional NG image and the pseudo image are similar, wherein in a case where the provisional NG image and the pseudo image are determined to be similar, the provisional NG particle is determined to include an OK particle.

* * * * *